US007189272B2

(12) United States Patent
Cheng

(10) Patent No.: US 7,189,272 B2
(45) Date of Patent: Mar. 13, 2007

(54) MOVABLE SPRAY PAINTING STAND

(75) Inventor: Chieh-Yuan Cheng, Taichung (TW)

(73) Assignee: San Ford Machinery Co., Ltd., Taichung (TW)

( * ) Notice: Subject to any disclaimer, the term of this patent is extended or adjusted under 35 U.S.C. 154(b) by 363 days.

(21) Appl. No.: 10/936,491

(22) Filed: Sep. 9, 2004

(65) Prior Publication Data

US 2006/0048488 A1 Mar. 9, 2006

(51) Int. Cl.
*B01D 29/50* (2006.01)
*B01D 50/00* (2006.01)

(52) U.S. Cl. ...................... 55/385.2; 55/356; 55/385.1; 55/419; 55/467; 55/482; 55/DIG. 18; 55/DIG. 46; 454/54; 454/63; 454/66; 118/326; 118/DIG. 7; 96/417; 96/422; 96/423

(58) Field of Classification Search ............... 55/385.1, 55/385.2, 356, 419, 467, 482, DIG. 18, DIG. 46; 454/54, 63, 66; 118/326, DIG. 7; 96/417, 96/422, 423
See application file for complete search history.

(56) References Cited

U.S. PATENT DOCUMENTS 4,498,913 A * 2/1985 Tank et al. ................... 55/356
5,230,723 A * 7/1993 Travis et al. .................... 96/57
5,702,493 A * 12/1997 Everetts et al. ............... 55/356
6,143,048 A * 11/2000 Comproni et al. ............ 55/356
6,758,875 B2 * 7/2004 Reid et al. ................. 55/385.2
6,783,563 B1 * 8/2004 Eckhoff et al. ............... 55/356

* cited by examiner

*Primary Examiner*—Minh-Chau T. Pham
(74) *Attorney, Agent, or Firm*—Troxell Law Office PLLC

(57) ABSTRACT

A movable spray-painting stand includes a worktable provided with four casters and having a wind-exhausting device and a filtering device assembled thereon. The wind-exhausting device has an air inlet communicating with the wind outlet of the filtering device. A separating device is provided in front of the wind inlet of the filtering device to form a spray painting space. A collapsible work frame is pivotally assembled with the work table and positioned under the separating device, able to be positioned in the spray painting space after articles to be spray painted are placed on its upper plate. The spray painting stand can be moved around freely, and the exhaust and the odor of paint produced during spray painting can be filtered by the filtering device, conforming to environmental protection and ensuring workers' health.

6 Claims, 5 Drawing Sheets

MOVABLE SPRAY PAINTING STAND

BACKGROUND OF THE INVENTION

1. Field of the Invention

This invention relates to a movable spray painting stand, particularly to one able to be moved around freely and having a function of filtering the exhaust and odor of paint produced in a spray painting process, conforming to environmental protection and ensuring workers' health.

2. Description of the Prior Art

Nowadays, most people have become do-it-yourself fans. They prefer to make, assemble and beautify things themselves so as to attain sense of fulfillment and sense of gratification. Spray painting is one of do-it-yourself work liked by people.

However, conventional spray-painting work always produces exhaust and odor of paint, not only affecting workers' health but also causing pollution to environment. A common family does not have a room to be exclusively used for doing spray painting work; therefore some of such work has to be done in a spray painting workshop, thus unable to obtain pleasure of DIY and possible to cause much inconvenience.

SUMMARY OF THE INVENTION

The objective of the invention is to offer a movable spray-painting stand having a wind-exhausting device and a filtering device assembled on a worktable having its four legs respectively provided with a caster. The wind-exhausting device has an air inlet communicating with the wind outlet of the filtering device. A separating device is provided at its wind inlet of the filtering device for forming a spray-painting space enclosed by blocking plates. A collapsible work frame is pivotally assembled with the work table under the separating device, able to be moved in the spray painting space after articles to be spray painted are placed on its upper plate.

The spray painting stand in the present invention can be moved around freely, and the wind-exhausting device is able to suck the exhaust and the odor of paint produced during spray painting into the filtering device to be filtered and, after filtered, the clean air is exhausted out through the wind-exhausting device, preventing air pollution, achieving an effect of environmental protection and ensuring workers' health.

BRIEF DESCRIPTION DRAWINGS

This invention will be better understood by referring to the accompanying drawings, wherein.

DETAILED DESCRIPTION OF THE PREFERRED EMBODIMENT

Figure 1:
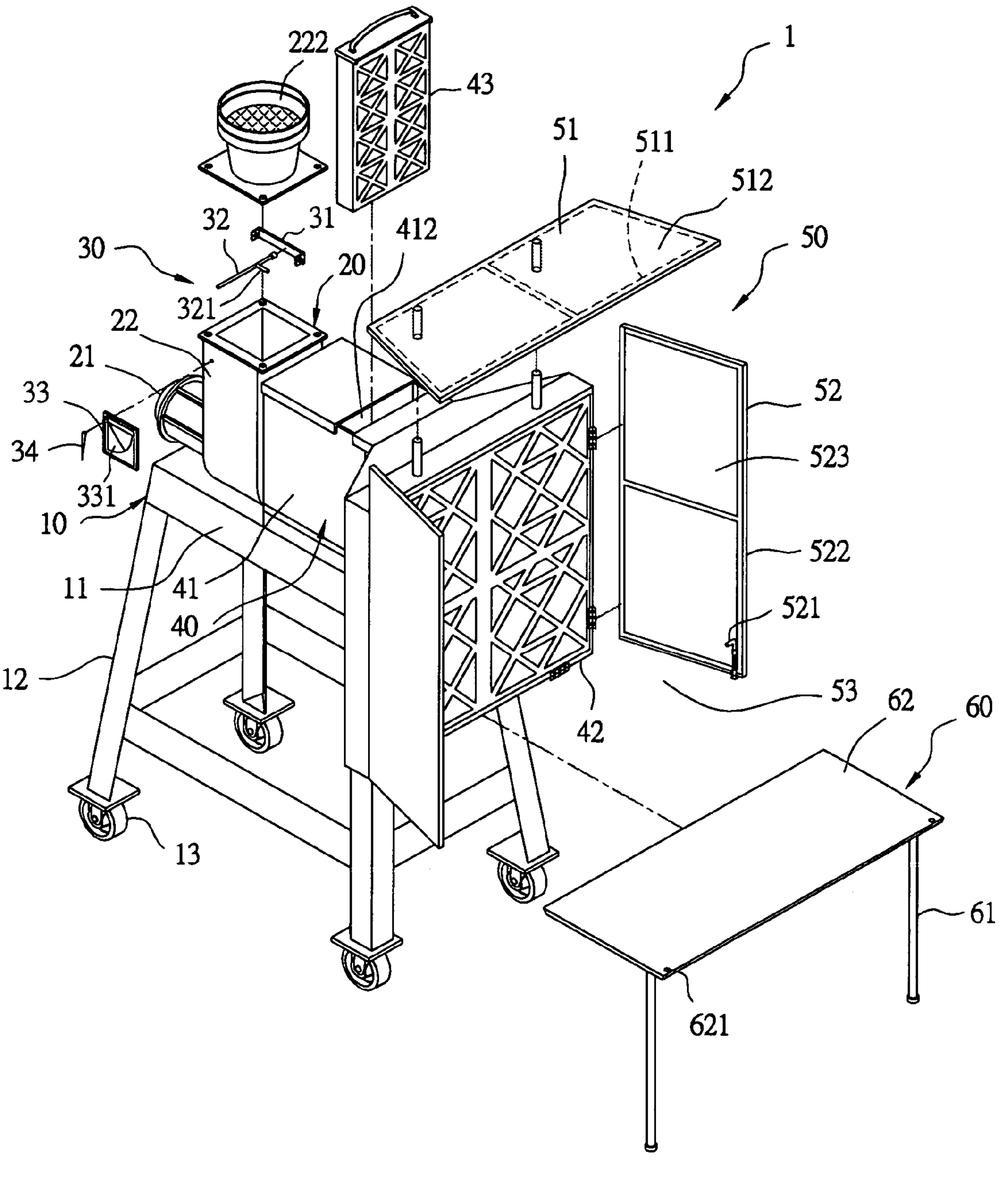
FIG. 1 is an exploded perspective view of a movable spray painting stand in the present invention.
Figure 2:
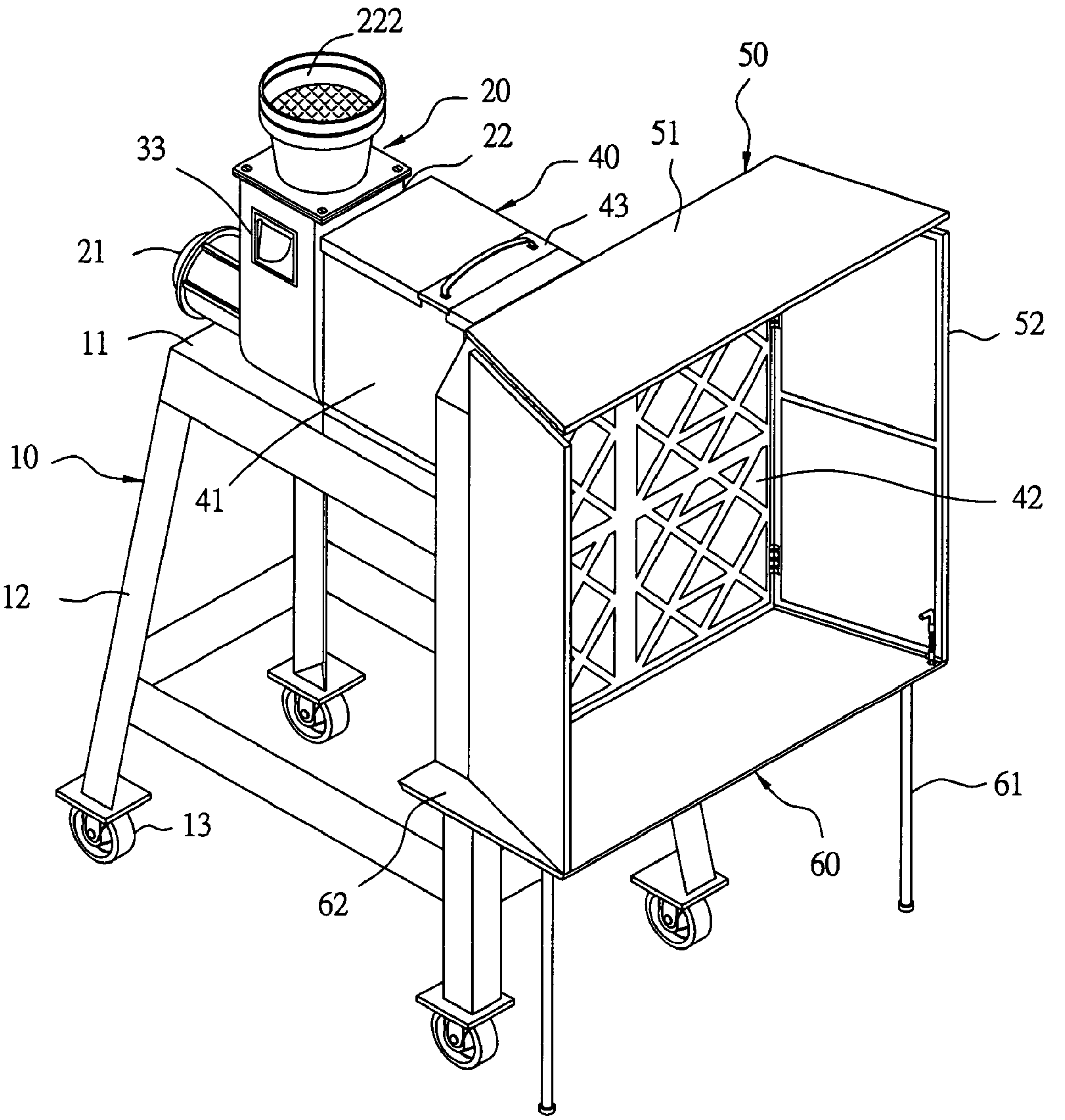
FIG. 2 is a perspective view of the movable spray painting stand in the present invention.
Figure 3:
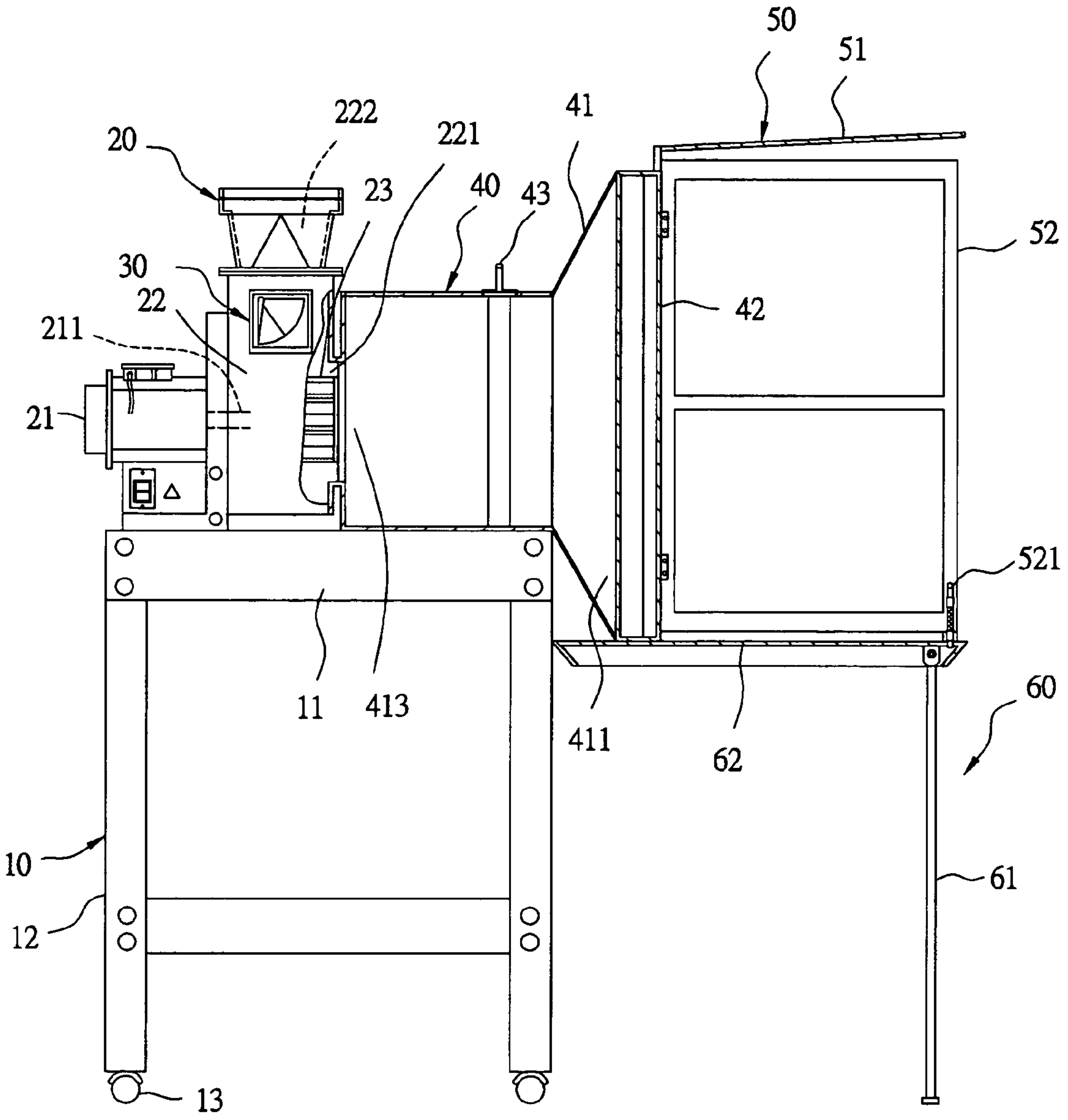
FIG. 3 is a side cross-sectional view of the movable spray painting stand in the present invention.

A preferred embodiment of a movable spray painting stand in the present invention, as shown in FIGS. 1, 2 and 3, includes a work table 10, a wind-exhausting device 20, a wind-power indicator 30, a filtering device 40, a separating device 50 and a work frame 60 combined together.

The worktable 10 has four legs 12 fixed under its tabletop 11, having a caster 13 assembled at the lower end of each leg 12.

The wind-exhausting device 20 assembled on the flat stand 11 of the worktable 10 is composed of a motor 21, a cover 22 and a blade wheel 23. The blade wheel 23 is assembled on the rotating shaft 211 at the front end of the motor 21 to be driven to rotate. The cover 22 is covered around the entire blade wheel 23, having its front side bored with an air inlet 221 and its topside bored with an air outlet 222.

Figure 5:
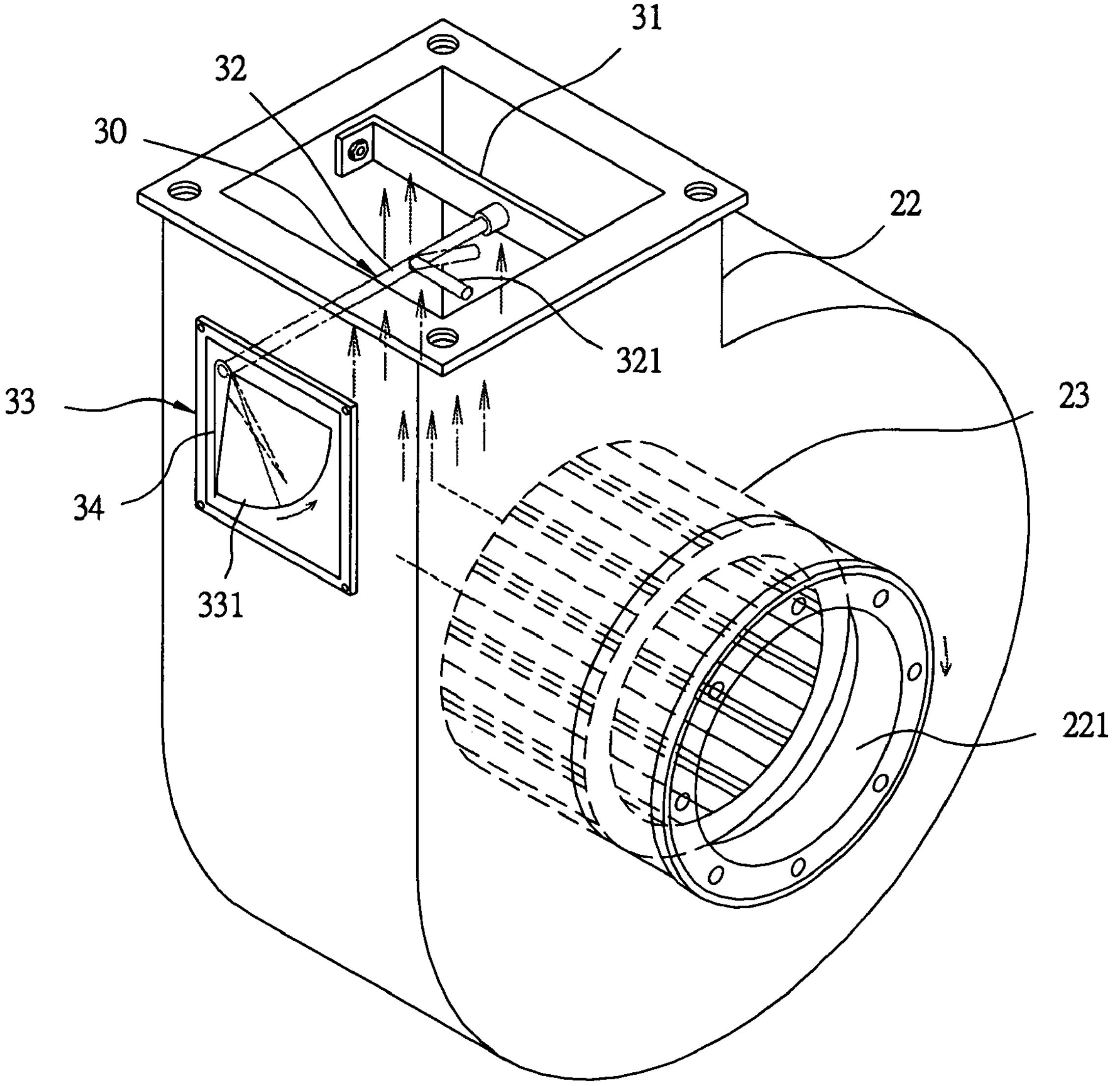
FIG. 5 is a perspective view of a wind-power indicator actuated to move by exhausted wind in the present invention.

The wind-power indicator 30, as shown in FIG. 5, includes a supporting member 31, a swing member 32, an indicating faceplate 33 and an index hand 34. The supporting member 31 is assembled inside the cover 22 of the wind-exhausting device 20 and positioned near the air outlet 222. The swing member 32 has one end pivotally positioned on the intermediate portion of the supporting member 31 and the other end pivotally inserted out of the opposed wall of the cover 22, having a wind-actuated rod 321 extending outward vertically from the intermediate portion and positioned at the air exhausting passageway of the air outlet 222 of the wind-exhausting device 20. The indicating faceplate 33 is assembled on the outer wall of the cover 22, which the swing member 32 is inserted therethrough. The indicating faceplate 33 is formed with different-colored indicating regions 331. The index hand 34 is fixed at the outer end of the swing member 32, able to swing on the indicating faceplate 33 together with the rotation of the swing member 32. Wind exhausting power can be known according to where the index hand 33 is located on the indicating region 331.

The filtering device 40 includes a machine housing 41, a first filtering plate 42 and a second filtering plate 43. The machine housing 41 has. its rear half portion formed with a rectangular body and its front half portion formed with a trumpet-shaped body able to increase an air sucking area and enlarge a spray painting space. The filtering device 40 assembled on the table top 11 of the work table 10 has its front end formed with a wind inlet 411, the upper side of its intermediate portion formed with a cut groove 412 and its rear end formed with a wind outlet 413 communicating with the air inlet 221 of the cover 22 of the wind-exhausting device 20. The first filtering plate 42 is assembled at the location of the wind inlet 411 of the machine housing 41, able to be disassembled from the machine housing 41, and the second filtering plate 43 is fitted in the cut groove 412 of the machine housing 41, able to be pulled out of the cut groove 412. The first and the second filtering plate 42, 43 are made of active carbon screen and non-woven fabric .

The separating device 50 consists of an upper blocking plate 51 and two side blocking plates 52. The upper blocking plate 51 is assembled on the topside of the machine housing 41 of the filtering device 40 and positioned above the wind inlet 411, expanding forward in a flaring shape. The two side blocking plates 52 are respectively and pivotally positioned at the opposite sides of the wind inlet 411 of the machine housing 41, respectively expanding outward gradually. The two side blocking plates 52 have their upper edges respectively connected with the upper blocking plate 51 together to form a spray painting space 53. Further, the two side blocking plates 52 respectively have the outer lower end provided with an elastic insert member 521 able to be elastically moved downward or pulled upward. Furthermore, the upper blocking plate 51 and the two side blocking plates 52 are respectively provided with a frame 511, 522 attached thereon with a cloth screen 512, 523.

The work frame 60 consists of plural feet 61 and an upper plate 62 positioned on the lower supporter 61, which are able to be collapsed and laid under the stand 62. The upper plate 62 is used for placing articles to be spray painted, having its inner end pivotally assembled with two opposed legs 12 of the work table 10 and able to be collapsed inward. The upper plate 62 of the work frame 60 has the outer ends of its opposite sides respectively bored with a positioning hole 621 for the elastic insert member 521 of the two side blocking plates 52 to be inserted and positioned therein to stabilize the two side blocking plates 52 on the work frame 60.

Figure 4:
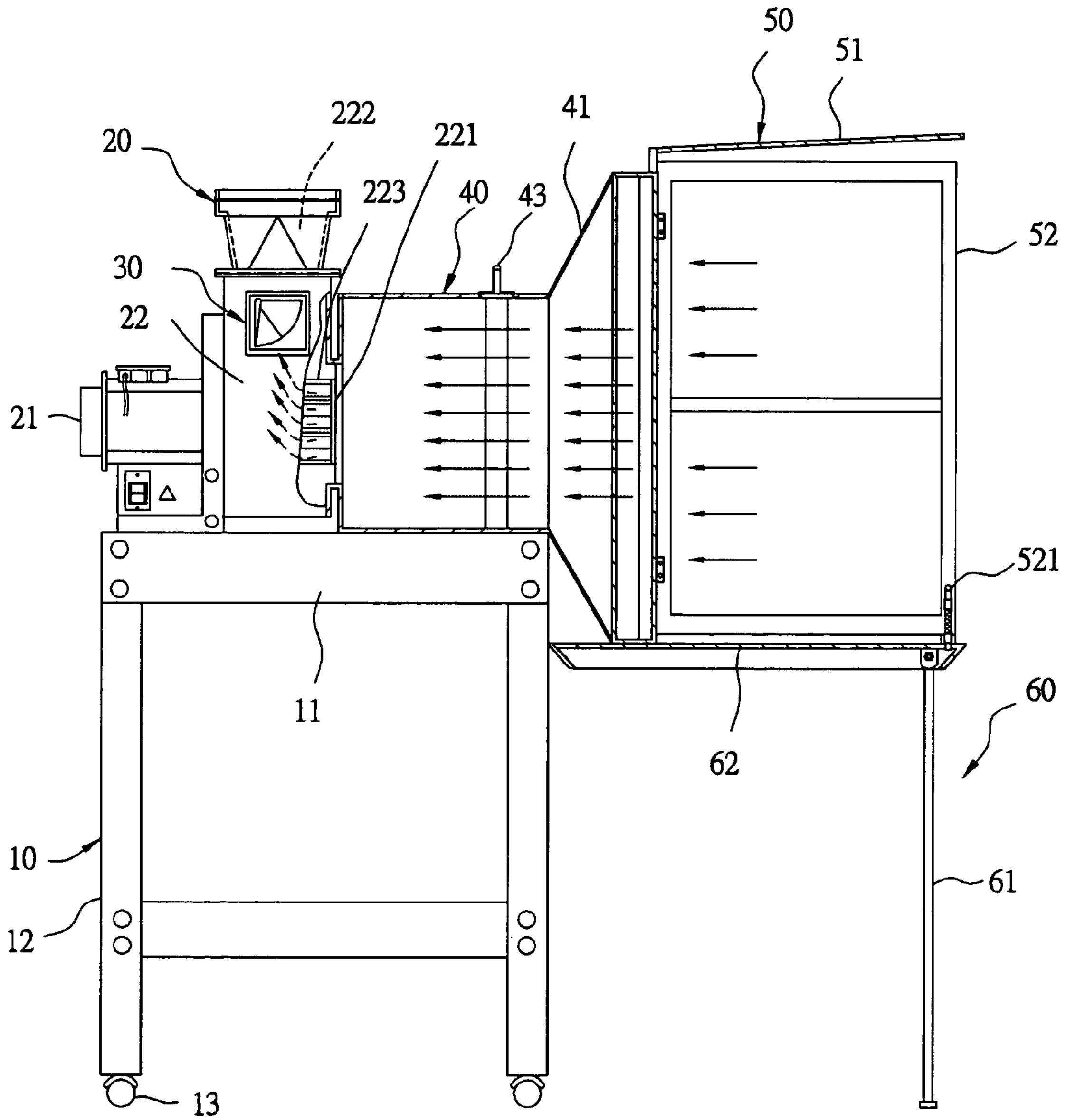
FIG. 4 is a side cross-sectional view of the movable spray-painting stand in a wind-sucking condition in the present invention.

In operating, as shown in FIG. 4, the motor 21 of the wind-exhausting device 20 is first started to drive the blade wheel 23 to rotate to let the wind inlet 411 of the filtering device 40 produce a vacuum sucking force to suck the exhaust and the odor of paint produced in the spray painting space 53 into the filtering device 40 to be orderly filtered by the first and the second filtering plate 42, 43 to become clean air. Afterward, the clean air flows out of the filtering device 40 through the wind outlet 413 and synchronously is sucked in to the wind-exhausting device 20 through the air inlet 221 to be exhausted out through the air outlet 222, thus finishing filtration of the exhaust and the odor of paint, attaining an effect of environmental protection and ensuring workers' health.

If the first and the second filtering plate 42, 43 of the filtering device 40 have been used for a period of time, they are likely to be stuck with dust and particles of paint and become clogged to lower their sucking force and filtering capability. Judging from the location of the index hand 34 of the wind-power indicator 30, a user is able to know the strength of air exhausted out through the air outlet 222 of the wind-exhausting device 20 and then judge whether or not the first and the second filtering plate 42, 43 are clogged and need to be replaced with new ones or cleaned, always maintaining an excellent effect of filtration.

As can be understood from the above description, this invention has the following advantages.

1. It is provided with the wind-exhausting device 20 to produce a sucking force, and the filtering device 40 with the first and the second filtering plate 42, 43 to carry out multiple filtration, able to effectively filter the exhaust and the odor of paint produced in a spray painting process to prevent environment from polluted and ensure workers' health.

2. The work table 10 has its four legs respectively provided with a caster 13 to enable the work table to be moved around freely, and both the separating device 50 and the work frame 60 are collapsible, facilitating operating and suitable for a common family or a small-sized workshop to use.

3. The wind-power indicator 30 is able to indicate the strength of exhausted wind so as to remind a user whether or not the first and the second filtering plate 42, 43 of the filtering device 40 are clogged and need to be replaced with new ones or cleaned, able to maintain an excellent effect of filtration.

4. The first filtering plate 42 is able to be disassembled from the filtering device 40, and the second filtering plate 43 can be pulled out of the cut groove 412 of the filtering device 40; therefore, both the first and the second filtering plate 42, 43 can easily be assembled or disassembled to be replaced with new ones or cleaned.

While the preferred embodiment of the invention has been described above, it will be recognized and understood that various modifications may be made therein and the appended claims are intended to cover all such modifications that may fall within the spirit and scope of the invention.

I claim:

1. A movable spray-painting stand comprising:

A work table provided with four legs under its table top, said four legs having their lower ends respectively assembled with a caster:

A wind-exhausting device assembled on said table top of said work table, said wind-exhausting device composed of a motor, a cover and a blade wheel, said blade wheel fitted on a rotating shaft at the front end of said motor to be driven to rotate, said cover covered around said blade wheel and having its front side bored with an air inlet and its topside bored with an air outlet:

A wind-power indicator comprising a supporting member, a swing member, an indicating faceplate and an index hand, said supporting member assembled inside said cover of said wind-exhausting device, said supporting member positioned near said air outlet of wind-exhausting device, said swing member having one end pivotally positioned on the intermediate portion of said supporting member, said swing member having the other end pivotally inserted out of the opposed wall of said cover, said swing member having its intermediate portion provided with a wind-actuated rod extending outward vertically, said wind-actuated rod positioned at the air exhausting passageway of said air outlet of said wind-exhausting device, said indicating faceplate assembled on the outer wall of said cover, which said swing member is inserted there-through, said index hand fixed at the outer end of said swing member, said index hand able to swing on said indicating faceplate together with the rotation of said swing member, a wind exhausting power able to be judged according to a spot where said index hand indicates on said indicating faceplate:

A filtering device composed of a machine housing, a first filtering plate and a second filtering plate, said machine housing assembled on said table top of said work table, said machine housing having its front end formed with an wind inlet and its rear end formed with a wind outlet, said wind outlet of said machine housing communicating with said air inlet of said cover of said wind-exhausting device, said first filtering plate assembled at the location of said wind inlet of said machine housing, said second filtering plate assembled at a location near the intermediate portion of said machine housing:

A separating device composed of an upper blocking plate and two side blocking plates, said upper blocking plate assembled on the topside of said machine housing of said filtering device and positioned above said wind inlet, said two side blocking plates respectively assembled at the opposite sides of said wind inlet of said machine housing, said two side blocking plates having their upper edges respectively connected with said upper blocking plate, said upper blocking plate and said two side blocking plate connected with one another to form a spray painting space: and A work frame composed of plural feet and an upper plate positioned on said feet, said feet able to be collapsed and laid under said stand, said upper plate used for placing articles to be spray painted, said upper plate having its inner end pivotally assembled with two opposed legs of said work table, said stand able to be pivotally turned inward and collapsed.

2. The movable spray painting stand as claimed in claim 1, wherein said second filtering plate is positioned in a cut groove bored at the upper side of the intermediate portion of said machine housing, able to be pulled out of said cut groove.

3. The movable spray painting stand as claimed in claim 1, wherein the rear half portion of said filtering device is rectangular-shaped and the front half portion is trumpet-shaped so as to increase an air-sucking area and enlarge a spray painting space.

4. The movable spray painting stand as claimed in claim 1, wherein said first and said second filtering plate of said filtering device are made of active carbon screen and non-woven fabric.

5. The movable spray painting stand as claimed in claim 1, wherein said upper blocking plate and said two side blocking plates are respectively provided with a frame attached thereon with a cloth screen.

6. The movable spray painting stand as claimed in claim 1, wherein said two side blocking plates of said separating device have their outer lower ends respectively fixed with an elastic insert member, and said upper plate of said work frame has the outer ends of its opposite sides respectively bored with a positioning hole so that said two side blocking plates can be stabilized on said upper plate by respectively inserting said elastic insert members into said positioning holes of said upper plate.

* * * * *